Sheet 2. 2 Sheets.
G. P. Clarke, M. B. & J. B. Edson.
Self Recording Pressure-Gauge.
N°. 93275. Patented Aug. 3, 1869.
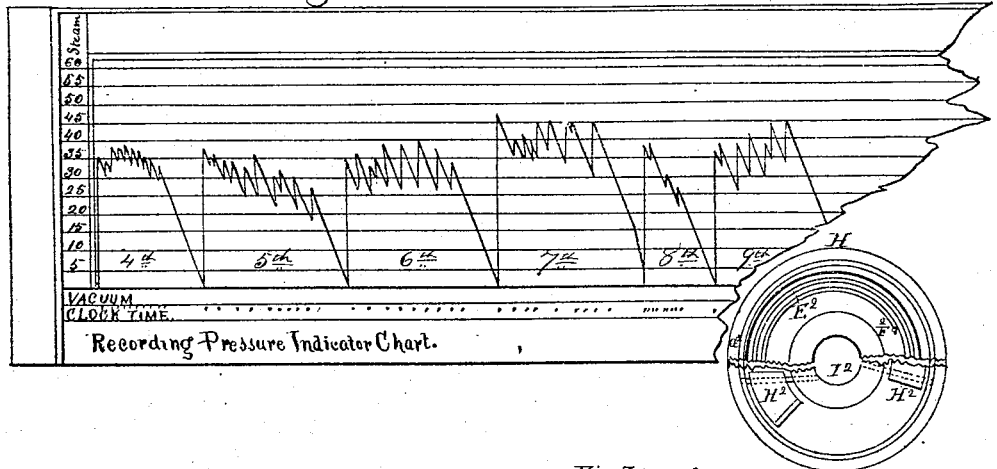
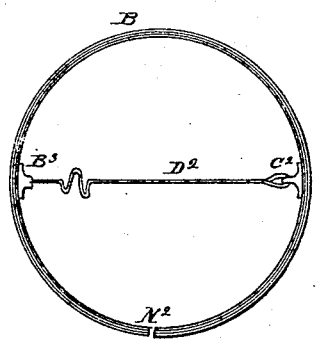
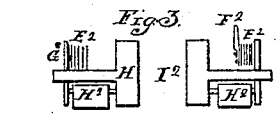
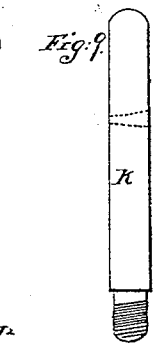
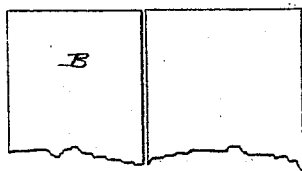
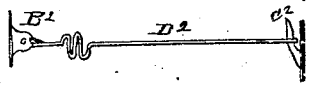
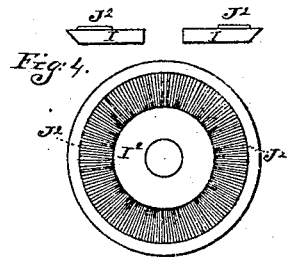
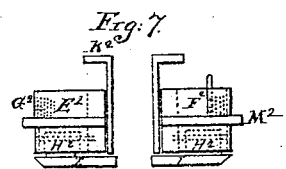
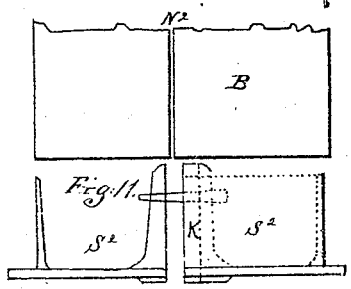
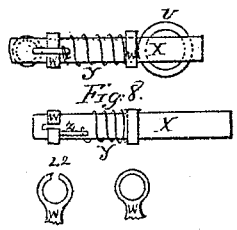
Witnesses:
J. P. Staples
G. W. Fox
Inventors:
George P. Clarke
Marmont B. Edson
James B. Edson

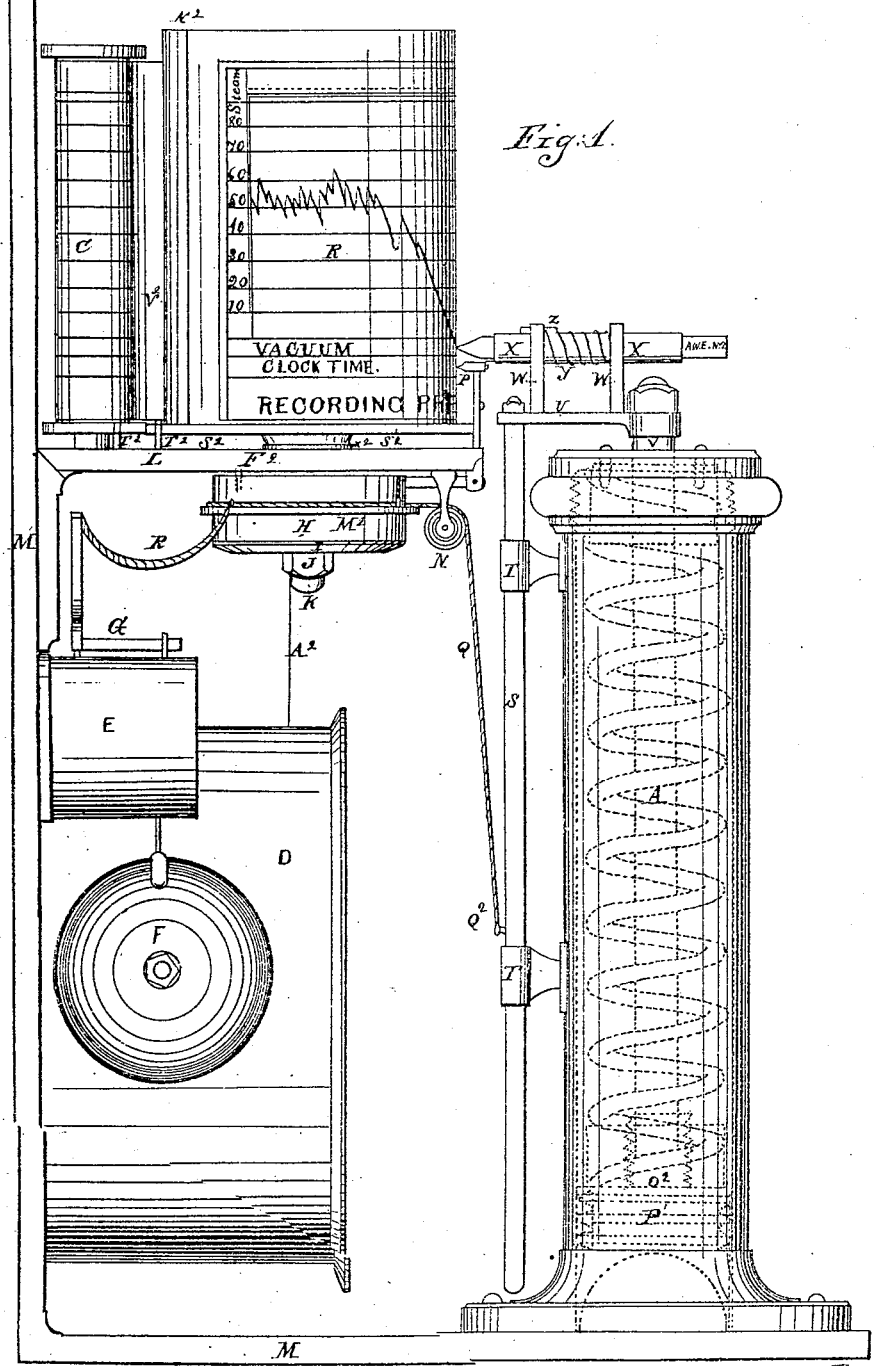

United States Patent Office.

GEORGE P. CLARKE, MARMONT B. EDSON, AND JARVIS B. EOSON, OF NEW YORK, N. Y., ASSIGNORS TO THE RECORDING STEAM-GAUGE COMPANY, OF SAME PLACE.

Letters Patent No. 93,275, dated August 3, 1869.

IMPROVEMENT IN SELF-RECORDING PRESSURE-GAUGE.

The Schedule referred to in these Letters Patent and making part of the same.

*To whom it may concern:*

Be it known that we, GEORGE P. CLARKE, MARMONT B. EDSON, and JARVIS B. EDSON, of the city of New York, have invented new and useful Improvements in Registering, Recording, and Alarm-Apparatus, which we denominate a "Recording Pressure-Gauge and Alarm," particularly designed for ascertaining and recording the pressure in steam-boilers, but which is applicable to other purposes, when it is desired to determine, register, and indicate varying pressures of steam, air, gas, or other fluids or liquids, in any vessel or reservoir in which such pressure may be exerted and used, and to give an alarm when such pressure reaches a dangerous degree.

The following is a full and exact description of our said invention, and of the manner of constructing and operating the same, reference being had to the drawings accompanying and making a part of this, our specification.

On the 5th of May, A. D. 1868, Letters Patent of the United States were issued to the said GEORGE P. CLARKE and MARMONT B. EDSON, No. 77,584, for an "improvement in registers for steam-engines."

The principal features of the invention described in said Letters Patent consist of a cylinder, piston, spring, and piston-rod carrying the registering-pencil, and the chart upon which the time, speed of the engine, and pressure of steam are automatically recorded by a continuous and positive motion obtained by connecting directly to the engine.

These, and the hollow rotating cylinder upon which the said chart is wrapped and secured, are all substantial features upon which our present invention is engrafted, but they do not of themselves, as therein described, and as then constructed, form any portion of the invention claimed as new in the present specification, and they are therefore hereby disclaimed.

The present invention consists in alterations, improvements, and additions in and to the apparatus described in the aforesaid Letters Patent, the nature and operation of which improvements, additions, and alterations will particularly appear in the description now to be given, as follows:

The drawings represent, in—

Figure I, a side elevation of the apparatus.

Figure II represents a side elevation of the rotating cylinder or drum B, on which the chart, Fig. X, is wrapped; also a horizontal cross-section of the same.

Figure III represents a horizontal section or plan of a barrel H, or circular case, and of the spring-coil E², and pawls H², as placed therein; also a vertical cross-section of the same, and the parts thereof.

Figure IV represents a plan and vertical section of a circular piece or ratchet-wheel, I, provided with teeth on its upper surface.

Figure V represents in detail the pawls H², shown in position in Fig. III.

Figure VI represents in plan view, and in vertical cross-section, a bush with flange serving as an axis for parts in Figs. III and IV, and as a base for supporting the carrier or rotating drum B.

Figure VII represents by a vertical cross-section, the parts in Figs. III, IV, V, and VI, in combination.

Figure VIII represents, in detail, the parts for carrying and regulating the indicating and recording-pencil.

Figure IX represents a spindle, K, or axis for the parts shown in Figs. III and IV.

Figure X represents a chart or paper diagram, marked with suitable vertical and horizontal spaces, for measuring time and the amount of pressure and variations in connection with the line described by the recording-pencil.

Figure XI shows an elevation and vertical section of the paper drum-holder, which is secured to the revolving spindle K, which passes through it.

In all the figures, the same letters and figures indicate the same parts.

Construction.

A suitable iron frame, M, Fig. I, for holding the apparatus is first constructed, consisting of a base, and an upright plate at a right angle to it, with a horizontal plate or platform, L, firmly secured to the upright portion of said frame M.

Upon the base or horizontal part of M is secured the cylinder A, Fig. I, similar to those generally used in steam-engine indicators, and having within the same a piston, fitted to its interior surface, and packed so as to be steam or water-tight.

A piston-rod, V, is attached to the piston, having its end projecting through and above the cylinder-cover.

A spiral spring, secured to the upper part or top of the piston, extends up to and is also secured to the under or inside of the cylinder-cover or cap.

This spiral spring surrounds the piston-rod V, and is shown, as connected, in O², Fig. I, by the dotted spiral lines within the cylinder A.

This spring O² is graduated in its power, so as to mark by its action the exact degrees of pressure exerted upon the bottom of the piston.

The piston-rod is cylindrical, and of equal diameter throughout, and it passes through an opening in the cylinder-cap, fitting it closely, but it is allowed to move freely up and down by the slightest variation of pressure upon the piston.

The piston-rod V is allowed to turn on its own axis, so as to adapt itself to the action of the spring, which will wind up or unwind, according as it is contracted or relaxed.

Upon the head of the piston-rod V is constructed a shoulder, and above this a screw-thread is cut for receiving a nut.

Upon this shoulder of the rod V we place one end of the horizontal arm and pencil-holder U, Fig. I, through a circular opening in the same, and in which the piston-rod turns freely, to correspond with the winding up or recoil of the spring within the cylinder as the pressure acts or relaxes upon the piston to which it is attached.

Upon the side of the cylinder A, Fig. I, are constructed two guides, T T, having circular vertical openings or holes, through which is placed the cylindrical vertical rod S, so as to play freely up and down.

To the head of the rod S is secured the outer end of the arm U, so that when the piston-rod V ascends or descends, it carries with it the rod S and operates its connecting parts and attachments.

Upon the upper side of the arm U are constructed the two parallel uprights W W, having in their upper ends circular openings, as shown in side elevation in Fig. VIII, one of which openings is slotted on the top $L^2$, Fig. VIII.

Through these openings is placed the tubular pencil-holder X, Fig. I, moving freely in a horizontal line, and also turning freely on its axis.

Around the tube X, and between the uprights W W, is placed the spiral spring Y, so arranged that it will constantly press the pencil towards and upon the chart on the drum B, hereinafter described.

Upon the upper surface of the tube X is placed a lug, Z, Fig. VIII, which freely slides through the slot $L^2$ in the upright W, and serves as a guide to the pencil-holder, and also as a stop when drawn back and turned to one side, thereby withholding the pencil-point from touching the chart whenever it is desirable to do so.

Upon the horizontal bracket L, Fig. I, is placed the base or carrier $S^2$, Fig. XI, made to revolve by an intermittent motion and to carry with it the paper-holder or drum B, Fig. II, which shuts down upon it.

This base or carrier, $S^2$, is secured to the spindle K, Figs. I and IX, which passes through the bracket-plate L.

The drum B, Fig. II, is made of thin sheet-brass, and is slotted its entire vertical length $N^2$.

Upon this drum is stretched the indicating-chart, the end or ends of the paper being drawn into the slot $N^2$, so as closely to draw the chart to the exterior surface of the drum B.

A spring, $D^2$, crosses from side to side, and in the interior of the drum B, which is so arranged by means of the inclined hook $C^2$, Fig. II, as to close the slot, holding the paper firmly within it by pressing down the looped end of $D^2$ on the inclined hook $C^2$.

Underneath the bracket L, and having for its axis the spindle K, is arranged the barrel H, Figs. I and III, having recesses in its upper and lower interior sides, Fig. III, and having on its exterior a projecting rim or flange, $M^2$, Fig. I.

In the upper recess is arranged the spring-coil $E^2$, Fig. III, one end of which is fast to the barrel at $G^2$, Fig. III, the other end being secured to the bracket L, by pin $F^2$, Figs. III and VII.

Within the lower side or recess of barrel H are hung the pawls $H^2$, Figs. III and V.

Underneath said barrel H, and secured to the spindle K, by the nut J, Fig. I, is also arranged the circular piece or ratchet-wheel I, Figs. I and IV, having teeth on its upper surface, into which the pawls $H^2$ mesh.

To the rim $M^2$, Fig. I, is attached a cord or other flexible material, passing around barrel H, and thence over guide-pulley N, Fig. I, and down to rod S, above the lower guide T, where it is connected to said rod S, as shown at $Q^2$, Fig. I.

A clock-alarm, E, and gong, F, Fig. I, of the usual construction, are provided and secured to the frame M.

One end of a flexible cord or chain, R, is fastened to the rim $M^2$ of barrel H, the other end being connected to the lever G of the clock-alarm E, so as to trip or unlatch said alarm when the pressure of the steam rises to a point of danger, which pressure causes the rod S to rise so far as to allow the spring $E^2$ to operate and turn the barrel H, which serves to trip the alarm-lever G by means of the connection R; or, when more convenient, we operate said alarm-lever G by connecting it directly to rod S.

Upon the diminution of pressure within the cylinder A, the cord $Q^2$, Fig. I, will permit the barrel H to react, thereby releasing the strain upon lever G, when the alarm-signal will cease.

To bracket L, Fig. I, is also attached the vertical vibrating arm or lever O, Fig. I, to the loose and upper end of which is affixed the horizontal point P, so that it shall mark the paper directly under the pencil, and in the space designated on the chart "clock-time."

In order to operate this point so as to strike and mark the paper chart each hour, it is connected with the hour-wheel of a time-piece or clock, by means of a connecting-wire, $A^2$, Fig. I, D representing the clock.

The clock is so constructed and arranged as to cause the point P to strike the paper, and indent, puncture, or mark it at each successive hour, or as desired.

The drawing represents the instrument of full size.

The apparatus may be enclosed in glass, and set in a metallic frame and locked, thus securing the working-parts from being tampered with and from dust.

The paper chart does not differ materially from the chart described in Letters Patent hereinbefore alluded to, except that there is the space added for denoting a vacuum, and that the vertical hourly lines are dispensed with.

Where a continuous record is required, as for a series of days, or a voyage, we reserve the right to use additional paper-holders, provided with long charts, which are wound off by the revolving drum B as required, and as shown at $V^2$, Fig. I, which shows the chart passing from reservoir-holder $C^2$ to drum B, Fig. I.

In order to secure tautness in these charts, pressure-pads $T^2$, Fig. I, are placed in contact with these revolving drums.

Having thus described the construction of our improved recording-instrument, we now describe the manner of operating and using the same.

The steam, air, gas, or other fluid under pressure, being admitted through a siphon attached to the bottom of cylinder A, operates the piston and gauge-spring $O^2$, and piston-rod V, and (by means of the connecting-bar or arm U, and its attachments and appendages, as shown upon the drawings,) elevates the pencil and holder X simultaneously with the uncoiling of the spring $E^2$, which rotates the barrel H around the spindle K, and which movement of the barrel H, when carried to its limit, is made to operate the alarm attached to the rim $M^2$ of barrel H, by cord or chain R, Fig. I, clock-work and trip-lever G, and gong F.

The uncoiling of the spring $E^2$ is effected by the rising of the auxiliary rod S, (with which said spring $E^2$ is connected by means of its fastening to barrel H at $G^2$, rim $M^2$, cord or chain Q, secured to said rod S at $Q^2$,) while the pressure is increasing upon the bottom of the piston.

Upon the partial withdrawal or reduction of the pressure beneath the piston, the gauge-spring within the cylinder A forces down the piston, piston-rod V, and its attachments, (connecting-bar or arm U, pencil-holder X, and auxiliary rod S,) and by means of the cord Q, partially rotates the drum B by the combined action of the said gauge-spring, connecting-arm U, rod S, cord Q, rim $M^2$ of barrel H, pawls $H^2$, and ratchet-wheel I, secured to spindle K.

The spiral spring coiled around the pencil-holder X, between the projections W W of the connecting-bar, or arm U, being secured to the lug Z, and having its bearing against one of the projections W, serves to press the pencil uniformly upon the paper surrounding the drum at all times, while the lug Z serves as a stop when the pencil-holder is drawn back by a slight turn to the right or left, so that said lug may rest against the forward projection W.

The striking-lever O being attached to the bracket L, and furnished with a suitable metallic or other point at its upper terminus, is operated by the timepiece D, through the connecting-wire $A^2$.

The additional revolving drum C is operated by the connection of the continuous strip of paper which is attached at either end to said drums B and C.

Results obtained.

The upward movement of the recording-pencil being in exact proportion to the compression of the gauge-spring, or, in other words, to the pressure exerted by the steam or other fluid, said pencil is caused to record the said degree of pressure, together with all and every fluctuation continuously during its existence; said records or tracings being, by these novel and peculiar arrangements and combinations, invariably vertical during the augmentation of such pressure, and oblique during the withdrawal of the same.

Said records are valuable in proportion to their reliability for correctness and precision in reference to data of degrees of pressure, and also concerning time of performance, as of an engine and boiler during any specific watch on board of steamers; also of a day's work in a factory where many hands are employed, or of a locomotive during a trip, or portion of a trip; also for data from which to determine in the choice between different kinds or qualities of fuel, attention to or the neglect of duties by engineers or their subordinates.

The actual or clock-time is also recorded upon the charts by means of the clock-movement D.

The automatic alarm being always given in advance of the extreme limit of pressure, (previously determined,) affords timely warning of approaching danger.

It is intended to place one of these instruments in the captain's cabin, as well as in the engine-room of steamers, and in the office of superintendents of manufactories, as well as in the engineer's department, and upon locomotive and stationary boilers, and upon every description of reservoirs which sustain great pressure, in order that all interested may be informed respecting the efficiency with which such reservoirs are managed, thereby acting as a precautionary means by which to secure additional safety to life and property.

We claim—

1. The combination and arrangement of the spring pressure-gauge, carrying a spring recording-pencil and parallel guide S, with the spring ratchet-barrel H, for giving an intermittent rotary movement to the drum B, so that the pencil will trace vertical lines during the increase of pressure, and oblique lines during the decrease of pressure, for the purposes and in the manner substantially as described.

2. The slot $N^2$ in drum B, in combination with the spring $D^2$ and the inclined hook $c^2$, for the purposes described.

3. The arrangement of the barrel H, containing the coiled spring $E^2$ in one side and the pawls $H^2$ in the other side, in combination with the toothed or ratchet-wheel I, secured to the revolving spindle K, which passes through the bracket L, and is secured to the drum paper-holder B, operating in the manner and for the purposes described.

GEORGE P. CLARKE.
MARMONT B. EDSON.
JARVIS B. EDSON.

Witnesses:
J. B. STAPLES,
G. W. FOX.